Feb. 7, 1961   R. F. STRINGER ET AL   2,971,035
PROCESS FOR THE DEHYDROGENATION OF HYDROCARBONS
IN THE PRESENCE OF SULFUR DIOXIDE AND A
CALCIUM NICKEL PHOSPHATE CATALYST
Filed Jan. 7, 1958
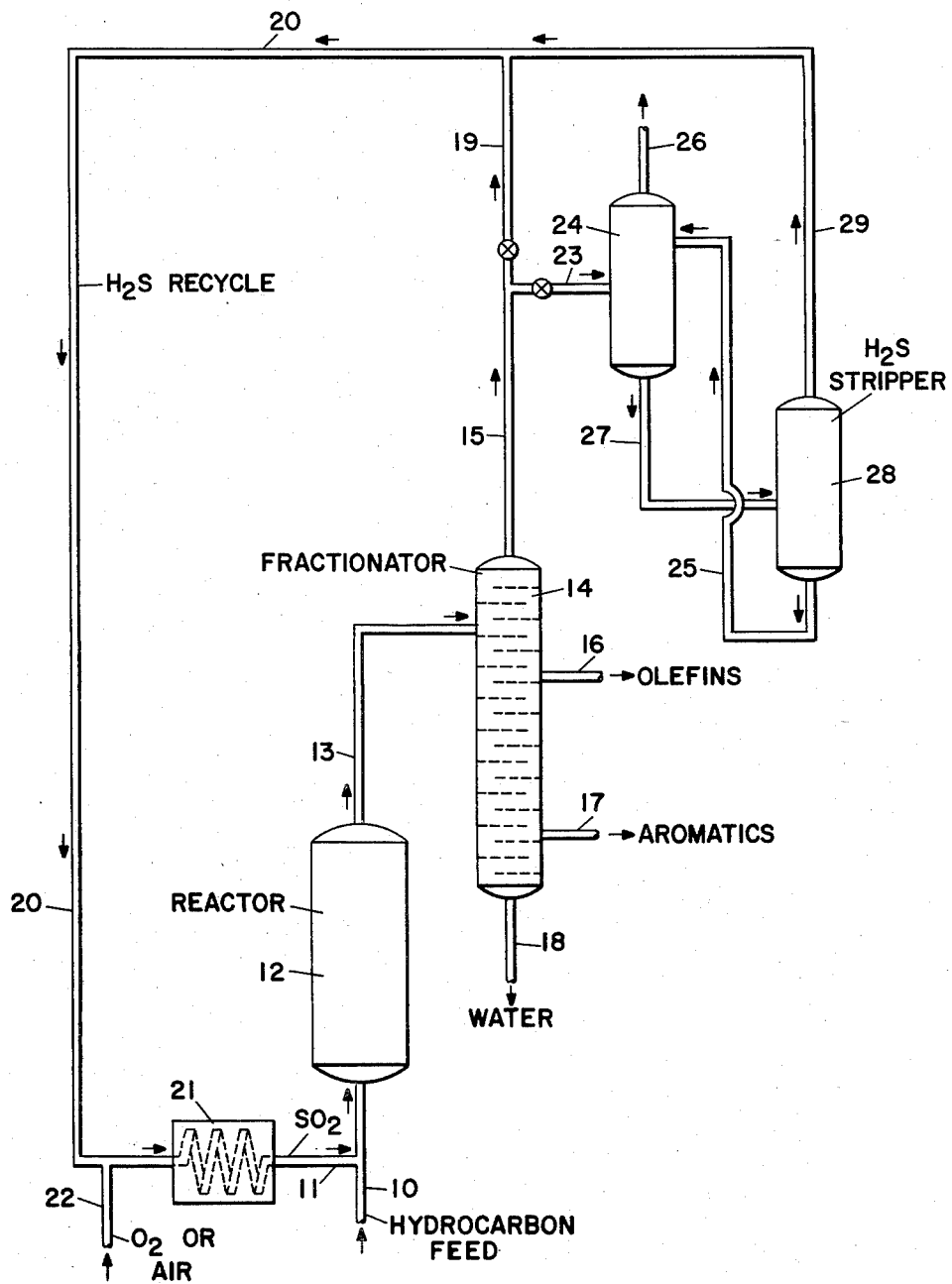
Richard Franklin Stringer
Charles Newton Kimberlin, Jr.   Inventors
Frances Sturgis McQuaid
By H. M. Flegier   Attorney

United States Patent Office 2,971,035
Patented Feb. 7, 1961

2,971,035
PROCESS FOR THE DEHYDROGENATION OF HYDROCARBONS IN THE PRESENCE OF SULFUR DIOXIDE AND A CALCIUM NICKEL PHOSPHATE CATALYST

Richard Franklin Stringer, Charles Newton Kimberlin, Jr., and Frances Sturgis McQuaid, all of Baton Rouge, La., assignors to Esso Research and Engineering Company, a corporation of Delaware
Filed Jan. 7, 1958, Ser. No. 707,636
6 Claims. (Cl. 260—673.5)

This invention relates to the dehydrogenation of hydrocarbons and more particularly to the dehydrogenation of hydrocarbons to produce aromatics and olefins.

Unsaturated hydrocarbons such as ethylene, propylene, butylenes, etc., are important starting materials for the production of a variety of chemical products, particularly polymers including low molecular weight polymers useful as motor fuels as well as viscous plastic to solid high molecular weight polymers.

It has been proposed to prepare such olefins, principally $C_2$ to $C_4$ olefins and also diolefins such as butadiene and isoprene by passing saturated hydrocarbons and mono-olefins such as butenes and amylenes through a bed of solid catalytic material maintained at suitable dehydrogenating conditions. It has also been proposed to dehydrogenate naphthenes such as cyclohexane and methyl cyclohexane to the corresponding aromatics. In view of current demands for benzene and toluene as solvents, chemical intermediates and premium motor fuel components, much effort is being expended to provide new and improved methods for producing these aromatics. A variety of catalysts and reaction conditions have been proposed for these conversions in order to increase yields and improve selectivity for the production of certain desired specific products.

It has further been proposed, in this connection, to incorporate an oxidizing agent or hydrogen acceptor in the hydrocarbon charge or reaction mixture in order to improve the conversion. For example Rosen, U.S. Patent No. 2,126,817, indicates that the conversion of butanes to butenes is improved by including an oxide of sulfur, preferably $SO_2$, in the hydrocarbon feed to a catalytic dehydrogenation zone. It has also been suggested that $SO_3$, $NO_2$, $NO$, $O_2$ and $CO_2$ act similarly to improve dehydrogenation. The mechanism by which these additives work is the subject of considerable doubt or controversy. One school of thought is that these materials react with the hydrogen produced by the dehydrogenation thereby causing a shift in the equilibrium of the reaction. Another school holds that the chief function of $SO_2$ in this system is to destructively oxidize hydrocarbons to produce very high temperatures in the bed which induce conversion of other hydrocarbons.

It has been found, and in general it appears from the literature, that in the conversion of saturated hydrocarbons to olefins and/or aromatics by previously suggested processes, low conversions per pass are obtained and production of undesirable low molecular weight hydrocarbons is excessive. Low conversions with present day catalytic processes is due, in general, to thermodynamic equilibrium favoring the saturated hydrocarbon. Poor selectivity is generally due to side reactions such as pyrolysis.

It is the object of this invention to provide the art with a new and improved method for dehydrogenating hydrocarbons.

It is also the object of this invention to provide the art with an improved process for dehydrogenating hydrocarbons, particularly saturated hydrocarbons and mono-olefins of six or more carbon atoms to olefins and/or aromatics.

It is a further object of this invention to dehydrogenate saturated hydrocarbons and mono-olefins of six or more carbon atoms to olefins and/or aromatics with high conversions and good selectivity.

Other objects will appear more clearly from the detailed specification and claims which follow.

It has now been found that hydrocarbons, including straight chain saturated hydrocarbons and mono-olefins of six or more carbon atoms such as N-hexane, cyclohexane, methyl cyclohexane, N-heptane and the like can be very effectively dehydrogenated to form olefins and/or aromatics by treatment thereof at elevated temperatures in the presence of sulfur dioxide and a calcium nickel phosphate catalyst. The specific combination of sulfur dioxide and this catalyst is extremely active and selective for dehydrogenating and aromatizing normal hexane. For example, in a 7 hour run conversion of N-hexane to a liquid product containing 50 wt. percent benzene and 20 wt. percent hexenes can be obtained with this combination of sulfur dioxide and this catalyst at 880° F. with essentially no light gas make.

The catalyst used in accordance with the present invention is formed by adding an aqueous solution of calcium and nickel salts containing from 6.5 to 12 atoms of calcium per atom of nickel, to a solution of a soluble phosphate, preferably an ortho phosphate, in a neutral or preferably alkaline condition. In a preferred embodiment the solution of the calcium and nickel salts is added with stirring to an aqueous solution of di- or triammonium phosphate in amount sufficient to maintain the mixture in alkaline condition. Alternatively, the catalyst may be prepared by adding an aqueous solution of phosphoric acid and the calcium and nickel salts to an aqueous solution of an alkali, preferably ammonia. The pH of the mixture should be between 7+ and 12, preferably at about 7.7 to 8.3.

Examples of nickel and calcium salts which may be used as starting materials in preparing the catalyst are the chlorides, nitrates, and acetates, etc. of these metals. Examples of soluble phosphates that may be employed as starting materials are disodium phosphate, trisodium phosphate, dipotassium phosphate, diammonium phosphate, etc. Catalyst products are particularly active when prepared by precipitation from alkaline mixtures containing an ionizable basic nitrogen compound, e.g. ammonia, a water-soluble ammonium salt, or a water-soluble amine or amine salt such as diethylamine, triethylamine or diethanolamine.

A normal calcium nickel phosphate is formed as fine flocks which settle slowly. After the fluocculent phosphate product has settled, it is separated from the supernatant clear liquid and washed repeatedly with water to remove soluble materials, particularly nickel salts and chloride ions, as completely as possible. The washed phosphate slurry is filtered to remove a further amount of water, and the residue is dried at temperatures of 140–300° F. The dried product which is a hard gel may be crushed or otherwise reduced to granules or small lumps and used in this form in a fixed bed reactor or may be reduced to a particle size convenient for use in a fluidized bed reactor. Alternatively, the gel may be pulverized, e.g. to a particle size capable of passing a 28 mesh screen and the product treated with a lubricant, preferably one capable of being removed by vaporization or oxidation such as graphite, a vegetable oil, or a hydrocarbon oil, etc. and formed into pills or pellets.

If desired, the pulverized gel may be blended with catalytically inactive substances such as diatomaceous earth, normal calcium phosphate, low surface area or fused alumina or the like without losing its catalytic activity. In view of the fact that the catalyst may eventually have carbonaceous deposits formed thereon which will have to be burned off, it may be desirable to add an agent having the property of catalyzing the oxidation of carbon. For example, the incorporation of one or two percent chromic oxide in the catalyst composition or pills facilitates the reactivation of the catalyst.

The hydrocarbons that can be effectively dehydrogenated in accordance with the present invention are paraffins and mono-olefins containing 6 or more carbon atoms per molecule preferably from 6 to 8 carbon atoms per molecule, as well as mixtures of two or more of these materials. The process is particularly valuable in that it is capable of converting n-hexane to benzene and hexenes and n-heptane to toluene and heptenes.

The dehydrogenation is effected in a reaction chamber charged with the above described catalyst. In view of the fact that carbon and stainless steels appear to have a tendency to reduce catalyst activity it is preferred to use Vycor or Solaramic lined reactor vessels. The catalyst may be freed of lubricant or other volatiles by heating to 1000° F. in a stream of air. Dehydrogenation is effected by passing the hydrocarbon feed stock with or without an inert gas such as nitrogen steam, carbon dioxide or the like and with the hydrogen acceptor, sulfur dioxide, at temperatures of about 800 to 1000° F. preferably at about 850° to 950° F. The hydrocarbon feed rate is ordinarily between about 0.05 and about 0.5 v./v./hr., preferably about 0.1 v./v./hr. The amount of sulfur dioxide added is preferably less than stoichiometric to the hydrocarbon feed in order to minimize the danger of forming elemental sulfur by the reaction of excess sulfur dioxide with the hydrogen sulfide formed. Reaction conditions, temperature and feed rate are so controlled as to effect at least 40% conversion of the hydrocarbons per pass.

Reference is made to the accompanying drawing illustrating a diagrammatic flow plan for the process in accordance with the present invention.

Referring to the drawing, hydrocarbon feed, for example, n-hexane is supplied through line 10 and mixed with sulfur dioxide supplied through line 11, preferably in admixture with nitrogen and passed at temperatures of 800 to 1000° F. through reactor 12. The reactor 12 is charged with a calcium nickel phosphate catalyst prepared as described above. It is preferred to conduct the process in a fluidized solids system and it therefore will be understood that 12 will comprise a reactor vessel and a regenerator vessel for burning off carbonaceous deposits with suitable transfer lines for conveying catalyst from each vessel to the other as is well known in the petroleum conversion art. In view of the exothermic nature of the reaction it is ordinarily desirable to include cooling coils or a steam boiler in the reaction zone in order to control temperature. The feed rate to the reactor 12 is controlled to give the desired conversion level. The reaction products are withdrawn from reactor 12 via line 13 and passed to fractionator 14 where they are separated into an overhead stream containing hydrogen sulfide and other gases, removed through line 15, olefinic product withdrawn at 16, aromatics withdrawn at 17 and water removed as bottoms. The hydrogen sulfide is removed via line 15 and recycled through lines 19 and 20 to furnace 21 where in admixture with oxygen or air supplied through line 22, the hydrogen sulfide is burned to sulfur dioxide for recycle in the process.

When air is used as the source of oxygen it may be necessary to pass the overhead gases from line 15 through line 23 to a suitable scrubber 24 for the separation of the hydrogen sulfide. A suitable absorbent such as diethanolamine is supplied via line 25 to the upper part of the scrubber so that countercurrent contact is effected with the hydrogen sulfide-containing gas. The gases freed of $H_2S$ pass overhead from scrubber 24 through outlet line 26 and the absorbent liquid is withdrawn from scrubber 24 via line 27 and passed to stripper 28 where the $H_2S$ is stripped off passing overhead through line 29 and thence to line 20 for recycle to the furnace 21 and reformation into $SO_2$. The stripped absorbent is withdrawn from the bottom of stripper 28 and recycled via line 25 to the scrubber 24.

The following examples describe certain ways in which the principle of this invention has been employed, but are not to be construed as limiting this invention.

EXAMPLE 1

Normal hexane was dehydrogenated by passing the same at elevated temperatures over a calcium nickel phosphate catalyst which contains 56% $PO_4$, 31% Ca, 5% Ni, 1% Cr and 7% $H_2O$. In these runs, 50 grams of this catalyst were arranged in a 1" x 15" Vycor reactor. The product from the reactor was collected in a wet ice trap plus a Dry Ice trap and analyzed by gas chromatography. The process variables and the results obtained are summarized in Table I.

*Table 1*

DEHYDROGENATION WITH $SO_2$ PLUS A CATALYST 50 cc. CALCIUM NICKEL PHOSPHATE CAT., 1" x 15" REACTOR

| Run No. | Cat. Age, Hr. | Feed | | | V./V./Hr. Hexane | Reactor Temp., °F. | Product Analysis, wt. percent | | | Remarks |
|---|---|---|---|---|---|---|---|---|---|---|
| | | Mol Percent $N_2$ | Mol Percent $SO_2$ | Mol Percent Hexane | | | n-Hexane | Hexenes | Benzene | |
| 11 | 0-0.5 | 75 | | 25 | 0.1 | 825 | 95 | Less than 5 | | No $SO_2$ in Feed. |
| 12 | 0-1 | 60 | 20 | 20 | 0.1 | 825 | 51 | 18 | 31 | No elemental S in Recovery System. |
| 13 [1] | 0-0.5 | 60 | 20 | 20 | 0.1 | 825 | 66 | 7 | 27 | Do. |
| 13 | 0.5-2 | 60 | 20 | 20 | 0.1 | 825 | 51 | 13 | 36 | Do. |
| 13 | 2-2.5 | 48 | 36 | 16 | 0.1 | 825 | 51 | 18 | 31 | Elemental S formed in Recovery System. |
| 14 [2] | 2.5-3.5 | 60 | 20 | 20 | 0.1 | 880 | 37 | 10 | 53 | No elemental S formed in Recovery System. |
| 14 | 3.5-3.7 | 51 | 31 | 18 | 0.1 | 880 | No Analysis | | | Elemental S formed in Recovery System. |
| 14 | 3.7-5.5 | 57 | 24 | 19 | 0.1 | 880 | 30 | 20 | 50 | No elemental S in Recovery System. |
| 15 [3] | 5.5-6.5 | 68 | 10 | 22 | 0.1 | 770 | 65 | 10 | 25 | Elemental S formed in Recovery System. |
| 16 [4] | 6.5-7.5 | 60 | 20 | 20 | 0.1 | 925 | 39 | 13 | 48 | No elemental S in Recovery System. |
| 16 | 7.5-8.0 | 57 | 24 | 19 | 0.1 | 925 | No Analysis | | | Elemental S formed in Recovery System. |
| 18 [5] | 0-1 | 60 | 20 | 20 | 0.1 | 880 | No Analysis | | | No Elemental S in Recovery System. |
| 18 | 1-2 | 60 | 20 | 20 | 0.1 | 880 | 54 | 7 | 39 | Do. |
| 19 [6] | 0-1 | 75 | | 25 | 0.1 | 880 | 86 | 5 | 9 | No $SO_2$ in Feed. |
| 19 | 1-2 | 60 | 20 | 20 | 0.1 | 880 | 67 | 3 | 30 | No elemental S in Recovery System. |
| 19 | 7-8 | 60 | 20 | 20 | 0.1 | 880 | 47 | 10 | 43 | Do. |
| 19 | 8-9 | 75 | | 25 | 0.1 | 880 | 80 | 12 | 8 | No $SO_2$ in Feed. |
| 19 | 13-14 | 60 | 20 | 20 | 0.1 | 880 | 28 | 9 | 63 | No elemental S in Recovery System. |
| 24 | 5-5.5 | 0 | 31 | 69 | 0.5 | 880 | 77 | 8 | 15 | Do. |
| 24 | 5.5-6.0 | 0 | 46 | 54 | 0.5 | 880 | 65 | 10 | 25 | Do. |
| 24 | 6.0-6.5 | 0 | 46 | 54 | 0.5 | 880 | 69 | 6 | 25 | Elemental S in Recovery System. |

[1] Catalyst pretreated with hydrogen for 30 minutes.
[2] Continuation of run 13 but at higher temperature.
[3] Continuation of run 13 but at lower temperature.
[4] Continuation of run 13 but at higher temperature.
[5] Catalyst from run 16 regenerated in air overnight.
[6] Fresh calcium nickel phosphate catalyst.

The following conclusions can be drawn from the foregoing data:

(1) Calcium nickel phosphate catalyst alone is inactive for dehydrogenation of normal hexane either initially or after it has been treated with $SO_2$ and hydrocarbon feed (run 19). This catalyst is commonly employed for butene dehydrogenation.

(2) Calcium nickel phosphate with sulfur dioxide is an extremely active catalyst for dehydrogenation of normal hexane. At 880° F. conversion to 20 mol percent hexenes plus 50 mol percent benzene was obtained (run 14).

(3) Calcium nickel phosphate catalyst becomes more active with age on sulfur dioxide plus hydrocarbon feed. (Runs 11, 12, 13, 14, 15, 16 and run 19.) The hydrogen pretreated catalyst (run 13) increased in activity faster than the unreduced catalyst employed in run 19. These data suggest that a sulfided form of the catalyst may contribute to activity.

(4) Without nitrogen diluent and at a higher hexane feed rate, the conversion or normal hexane decreases (run 24). However, the actual quantity of hexane converted per unit time is the same as that achieved at higher conversion with lower feed rates and nitrogen diluent.

(5) Air regeneration of calcium nickel phopshate catalyst does not effect its activity (run 18).

(6) Increasing the reactor temperature from 825° F. to 880° F. gave an appreciable increase in conversion (run 14) but a further increase from 880° F. to 925° F. did not increase conversion (run 16).

(7) If an excess of sulfur dioxide is used over that required for converting hydrogen from dehydrogenation to $H_2S$ and $H_2O$, elemental sulfur appears in the product recovery system due to reaction of $SO_2$ with $H_2S$.

In a similar series of experiments n-hexane was treated under essentially the same conditions in the presence of a potassia- and ceria-promoted chromia-alumina catalyst and also in the presence of a nickel on celite, 20 wt. percent nickel (reduced) on celite treated with $H_2S$ for one hour before the run. The latter was very active but produced up to 8 percent of a material tentatively identified as alkyl thiophenes. The promoted chromia-alumina catalyst gave relatively low conversions (less than 35%) of aromatics plus olefins.

EXAMPLE 2

Normal hexane was reacted with sulfur dioxide by passing the same at a feed rate of 0.1 v./v./hr. at 880° F. and atmospheric pressure over 250 cc. of a calicum nickel phosphate catalyst arranged in a 2" x 15" Vycor reactor. The process variables and the results obtained are summarized in Table II.

Table II

| Hour | 2-3 | 5-6 | 8-9 | 9-10 | 10.5-11.5 |
|---|---|---|---|---|---|
| Feed: | | | | | |
| Mol percent Nitrogen | 54 | 50 | 0 | 0 | 0 |
| Mol percent $SO_2$ | 22 | 27 | 53 | 59 | 46 |
| Mol percent Hexane | 24 | 23 | 47 | 41 | 54 |
| Sulfur in Recovery System | No | No | Yes | Yes | Yes |
| Cat. Hours on Feed | 3 | 6 | 9 | 10 | 11.5 |
| Liquid HC Recovery: Vol. Percent on Hexane Feed | 63 | 64 | 63 | 50 | 70 |
| Liquid Product Comp.: | | | | | |
| Wt. Percent n-Hexane | 66 | 35 | 50 | 36 | 64 |
| Wt. Percent Hexenes | 4 | 16 | 10 | 13 | 9 |
| Wt. Percent Benzene | 30 | 49 | 40 | 51 | 27 |

EXAMPLE 3

Normal hexane was reacted with sulfur dioxide by passing the same at a feed rate of 0.1 v./v./hr. at 975° F. over 50 cc. of a calcium nickel phosphate catalyst containing 1.3 wt. percent of carbon arranged in a 1" x 15" Vycor reactor. The process variables and results obtained are summarized in Table III.

Table III

| Hour | 0-2 | 2-4 | 4-7 | 7-9 | 9-11 |
|---|---|---|---|---|---|
| Feed: | | | | | |
| Mol Percent Nitrogen | 60 | 60 | 60 | 60 | 66 |
| Mol Percent $SO_2$ | | 20 | | | 12 |
| Mol Percent Hexane | | 20 | | | 22 |
| Sulfur in Recovery System | No | No | No | Yes | Yes |
| Cat. Hours on Feed | 2 | 4 | 7 | 9 | 11 |
| Liquid HC Recovery: Vol. Percent on Hexane Feed | 47 | 50 | 49 | 44 | 70 |
| Liquid Product Comp.: | | | | | |
| Wt. Percent n-Hexane | 37 | 37 | 29 | 29 | 47 |
| Wt. Percent Hexenes | 7 | 6 | 6 | 5 | 12 |
| Wt. Percent Benzene | 56 | 57 | 65 | 66 | 41 |

EXAMPLE 4

Normal heptane and cyclohexane was reacted with sulfur dioxide by passing the same through a fluidized bed of calcium nickel phosphate at a feed rate of 0.1 v./v./hr. at atmospheric pressure. The process variables and the results obtained are summarized in Table IV.

Table IV

| Feed | n-Heptane | | | n-Heptane | | Cyclohexane | | |
|---|---|---|---|---|---|---|---|---|
| Run, Hr | 0-3 | 3-6 | 6-7 | 0-3 | 3-5 | 0-3 | 3-6 | 6-7 |
| Reactor Temp., °F. | 880 | 880 | 880 | 950 | 950 | 880 | 880 | 880 |
| Feed, Mol percent: | | | | | | | | |
| Nitrogen | 50 | 50 | 50 | 48 | 48 | 40 | 40 | 40 |
| $SO_2$ | 25 | 25 | 25 | 29 | 29 | 30 | 30 | 30 |
| n-Heptane | 25 | 25 | 25 | 23 | 23 | | | |
| Cyclohexane | | | | | | 30 | 30 | 30 |
| Liquid HC Recovery: Vol. Percent on HC Feed | 66 | 70 | 83 | 52 | 50 | 72 | 72 | 75 |
| Liquid Product Comp., Wt. Percent: | | | | | | | | |
| Heptane | 78 | 70 | 66 | 41 | 32 | | | |
| Heptenes | | | | | | | | |
| Cyclohexane | | | | | | 47 | 40 | 29 |
| Benzene | | | | | | 50 | 57 | 70 |
| Toluene | 22 | 30 | 34 | 45 | 56 | | | |
| Unidentified | | | | 14 | 12 | 3 | 3 | 1 |

EXAMPLE 5

Normal hexane was reacted with sulfur dioxide in contact with a fluidized bed of calcium nickel phosphate catalyst. The hexane feed rate was 0.1 v./v./hr., temperature was 880° F. and pressure atmospheric. The process was carried out in four six hour cycles on feed with catalyst regeneration with air at 880° F. between cycles. In each of the four cycles that were run, the feed consisted of 60 mol percent nitrogen, 20 mol percent sulfur dioxide and 20 mol percent n-hexane. The results are summarized in Table V.

Table V

| Cycle No | 1 | | 2 | | 3 | | 4 | |
|---|---|---|---|---|---|---|---|---|
| Run Hr | 0-3 | 3-6 | 0-3 | 3-6 | 0-3 | 3-6 | 0-3 | 3-6 |
| Liquid HC Recovery: Vol. percent on Feed | 69 | 63 | 64 | 68 | 68 | 69 | 68 | 66 |
| Liquid Product Comp.: | | | | | | | | |
| Wt. Percent Hexane | 48 | 43 | 44 | 45 | 56 | 58 | 53 | 44 |
| Wt. Percent Hexenes | 6 | 3 | 4 | 5 | | 2 | 5 | 5 |
| Wt. Percent Benzene | 46 | 54 | 52 | 50 | 44 | 40 | 42 | 51 |

Sixteen wt. percent of catalyst were lost from the reactor during cycle 3 accounting for the lower yield obtained. 16 wt. percent of fresh catalyst (based on original charge) were added to the regenerated catalyst prior to the start of cycle 4.

The foregoing description contains a limited number of embodiments of the present invention. It will be understood that this invention is not limited to the specific examples since numerous variations are possible with-

What is claimed is:

1. A method for the dehydrogenation of hydrocarbons containing at least six carbon atoms per molecule to form aromatics and olefins which comprises reacting said hydrocarbons with sulfur dioxide at elevated temperatures in contact with a calcium nickel phosphate catalyst.

2. The process for dehydrogenating hydrocarbons containing at least six carbon atoms per molecule to olefins and aromatics which comprises reacting the said hydrocarbons with sulfur dioxide at temperatures of from 800 to 1000° F. in contact with a calcium nickel phosphate catalyst until at least 40% of the hydrocarbons is converted to olefins and aromatics.

3. The process as defined in claim 2 in which the amount of sulfur dioxide is less than stoichiometric with respect to the hydrocarbon feed.

4. The process as defined in claim 3 in which the calcium nickel phosphate catalyst consists of 56% $PO_4$, 31% Ca, 5% Ni, 1% Cr and 7% $H_2O$.

5. The process as defined in claim 4 in which the hydrocarbon feed rate is between 0.05 and 0.5 v./v./hr.

6. The process as defined in claim 5 in which the hydrocarbon feed rate is about 0.1 v./v./hr. and the reaction temperature is 850–950° F.

References Cited in the file of this patent

UNITED STATES PATENTS

| | | |
|---|---|---|
| 2,126,817 | Rosen | Aug. 16, 1938 |
| 2,324,073 | Gaylor et al. | July 13, 1943 |
| 2,394,750 | Cole et al. | Feb. 12, 1946 |
| 2,754,345 | Kirshenbaum | July 10, 1956 |
| 2,831,042 | Sieg | Apr. 15, 1958 |
| 2,856,441 | Murray | Oct. 14, 1958 |
| 2,867,677 | Murray | Jan. 6, 1959 |
| 2,884,473 | Reilly et al. | Apr. 28, 1959 |